Oct. 31, 1933.  A. ANDERSON  1,932,947
CUTTER CHAIN FOR COAL CUTTING MACHINES
Filed March 20, 1933   3 Sheets-Sheet 3
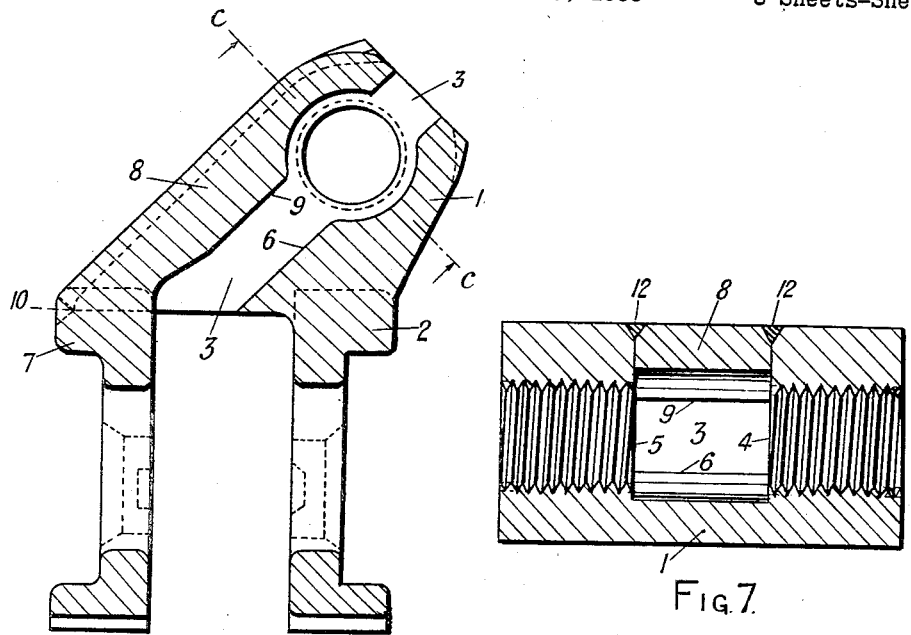
Fig.6
Fig.7.
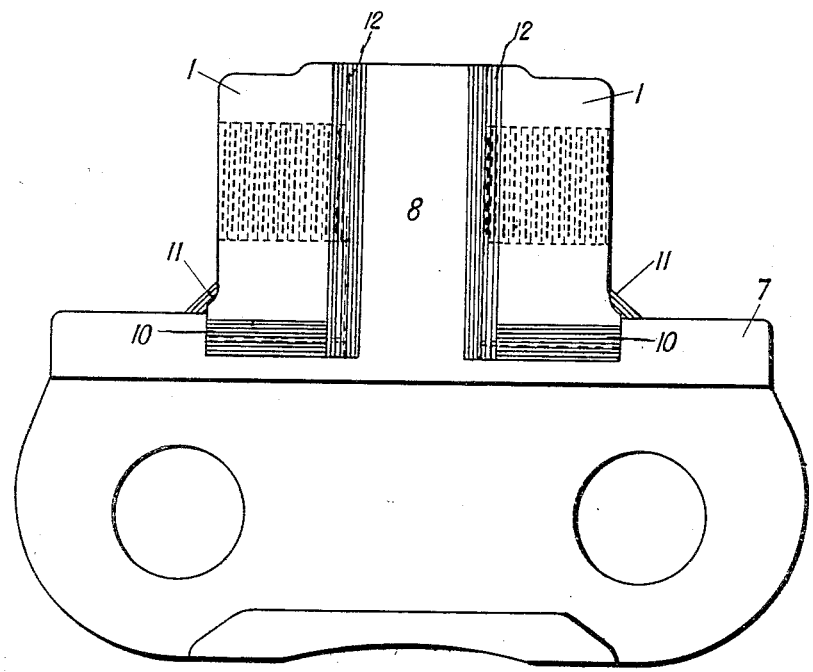
Fig.8.
Inventor
Alexander Anderson
By Pennie Davis Marvin & Edmonds
Attorneys Patented Oct. 31, 1933

1,932,947

UNITED STATES PATENT OFFICE 1,932,947

CUTTER CHAIN FOR COAL-CUTTING MACHINES

Alexander Anderson, Motherwell, Scotland, assignor to Anderson, Boyes & Company Limited, Motherwell, Scotland, a company of Great Britain Application March 20, 1933, Serial No. 661,657, and in Great Britain September 28, 1932

2 Claims. (Cl. 262—33)

This invention relates to cutter chains for coal-cutting machines of the type in which each pick-carrying block comprises side plates united by a bridge portion which, being formed with a pick-receiving socket, constitutes a pick box.

A pick-carrying block for cutter chains of this type as constructed heretofore is provided with a solid bridge member in which is formed, by a machining operation known as "broaching", a socket of substantially rectangular cross section which receives a pick of corresponding section. In practice, it is found that the method of producing the socket by "broaching" is costly. In the production of such pick-carrying blocks it has been usual to connect the bridge member with at least one side plate by a welding operation, the weld being confined to an interrupted line at the junction of the outer face of the side plate and the adjacent inner face of the bridge member. Such welds are found to be unsatisfactory in that they promote distortion of the pick-carrying block.

The present invention has for its primary object to provide a pick-carrying block for cutter chains in which the pick-receiving socket in the bridge member may be produced by inexpensive machining methods and in which the welding operation is not attended by distortion of the block.

With this object in view the invention provides a pick-carrying block for cutter chains comprising a bridge member integral with a side plate and formed by a machining operation such as a milling or equivalent operation with a notch which affords certain of the walls of a pick-receiving socket of non-circular cross section, an associated side plate formed with an integral horn accommodated in the notch so as to fill the open side of the notch and to constitute the remaining wall of the pick-receiving socket, and welds uniting the associated side plate with the bridge member which extend along the adjoining outer edges of the bridge member and along the side plate incorporating the horn and along the outer boundaries of the notch and the adjoining edges of the horn.

Figure 1:
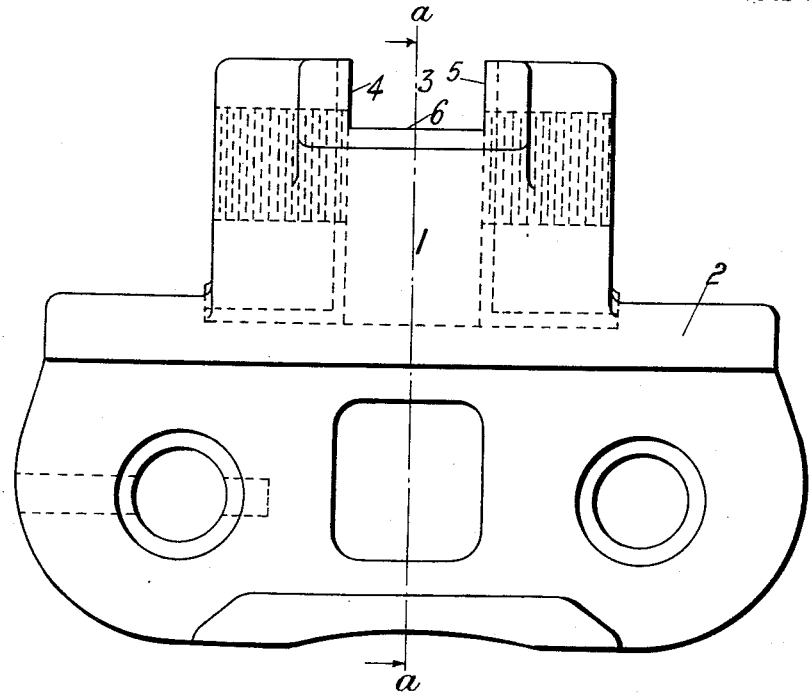
Figure 2:
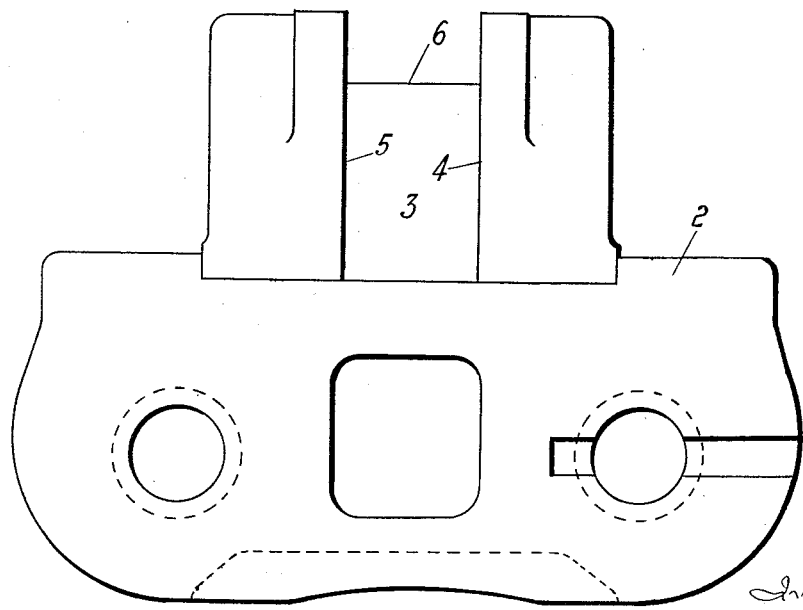
Figure 3:
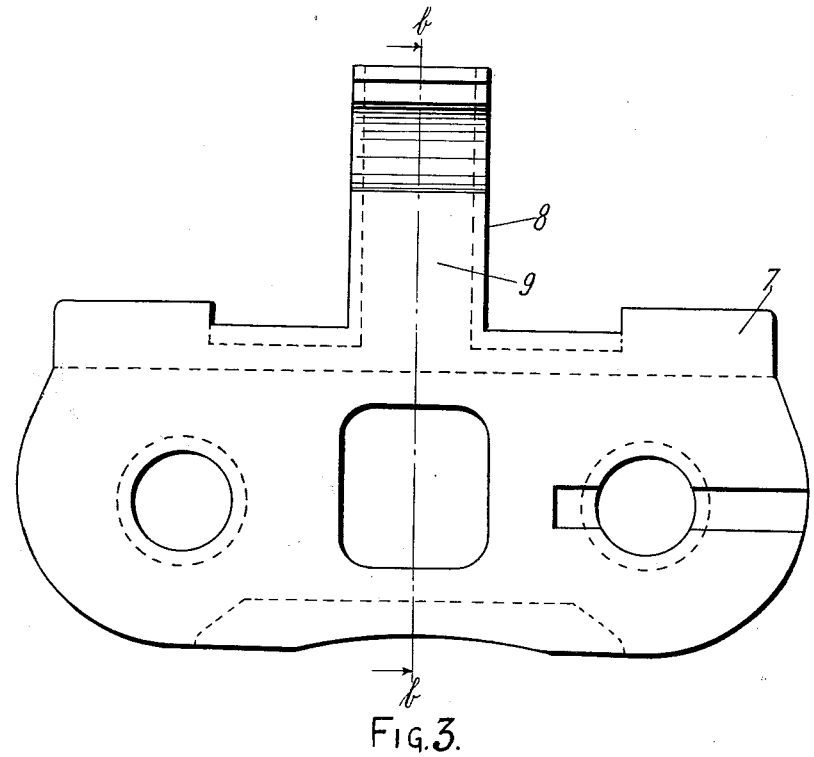
Figures 4, 5:
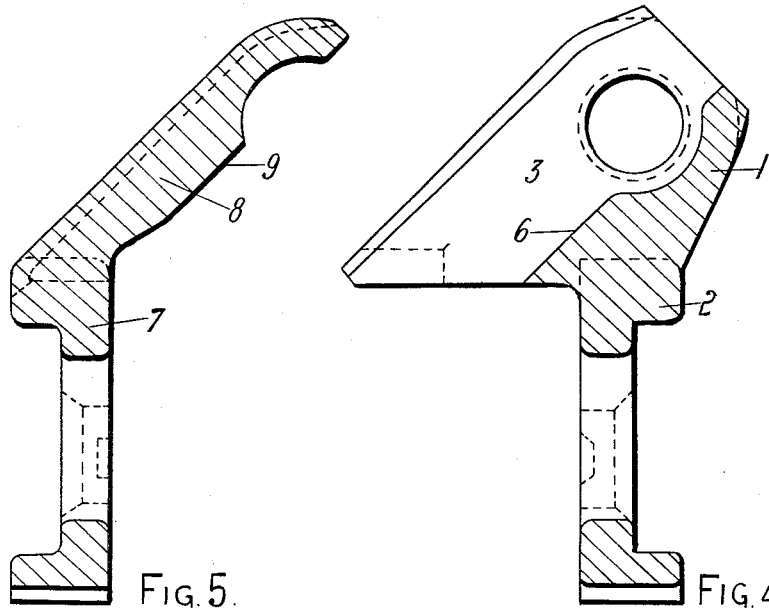

A pick-carrying block for a cutter chain constructed in accordance with the invention is illustrated in the drawings in which Figs. 1 and 2 are elevations looking on the outer and inner faces, respectively, of one side plate of the block, Fig. 3 an elevation looking on the inner face of the other side plate of the block, Fig. 4 a transverse section on the line a—a of Fig. 1, Fig. 5 a transverse section on the line b—b of Fig. 3, Fig. 6 a transverse section showing the side plates assembled, Fig. 7 a section on the line c—c of Fig. 6, and Fig. 8 a side elevation showing the plate assembled and united by welding.

The pick-carrying block shown comprises a bridge member 1 integral with a side plate 2 and formed by a machining operation such as a milling or equivalent operation with a notch 3 which affords certain of the walls, i. e., three walls 4, 5, 6 of a pick-receiving socket of non-circular, i. e., rectangular cross section. The associated side plate 7 is formed with an integral horn 8 accommodated in the notch 3 so as to fill the open side of the notch and to constitute the remaining wall, i. e., the fourth wall 9 of the pick-receiving socket. The side plates 2 and 7 are united by welding at 10 and 11 along adjoining edges of the bridge member 1 and the side plate 7 and at 12 along adjoining edges of the notch walls 4, 5 and the horn 8, the weld metal at 10 and 12 being applied to grooves formed in the adjoining edges.

I claim:

1. For a cutter chain of the type referred to for coal-cutting machines, a pick-carrying block comprising a bridge member integral with a side plate and formed by a machining operation, such as a milling or equivalent operation, with a notch which affords certain of the walls of a pick-receiving socket of non-circular cross section, an associated side plate formed with an integral horn accommodated in said notch so as to fill the open side of said notch and to constitute the remaining wall of said pick-receiving socket, and welds uniting the associated side plate with said bridge member which extend along the adjoining outer edges of said bridge member and said side plate incorporating said horn and along the outer boundaries of said notch and the adjoining edges of said horn.

2. For a cutter chain of the type referred to for coal-cutting machines, a pick-carrying block comprising, in combination, a bridge member integral with a side plate and formed by a machining operation such as a milling or equivalent operation, with a notch which affords three walls of a pick-receiving socket of rectangular cross section, an associated side plate formed with an integral horn accommodated in said notch so as to fill the open side of said notch and to constitute the fourth wall of said pick-receiving socket, and welds uniting the associated side plate with said bridge member which extend along the adjoining outer edges of said bridge member and said side plate incorporating said horn and along the outer boundaries of said notch and the adjoining edges of said horn.

ALEX. ANDERSON.